United States Patent [19]
Zweig et al.

[11] 4,216,132
[45] Aug. 5, 1980

[54] HDPE-CONTAINING FOOTWEAR COMPOSITION

[75] Inventors: Judith E. Zweig; Glenn R. Himes, both of Houston, Tex.

[73] Assignee: Shell Oil Company, Houston, Tex.

[21] Appl. No.: 36,274

[22] Filed: May 4, 1979

[51] Int. Cl.² ............................................. C08K 5/01
[52] U.S. Cl. ............................. 260/33.6 AQ; 36/87; 260/42.47; 525/89
[58] Field of Search ................... 260/42.47, 336 AQ; 525/89; 36/87

[56] References Cited

U.S. PATENT DOCUMENTS

| Re. 28236 | 11/1974 | Hendricks et al. | 36/87 |
|---|---|---|---|
| 3,424,649 | 1/1969 | Nyberg et al. | 525/89 |
| 3,459,830 | 8/1969 | Legge et al. | |
| 3,562,356 | 2/1971 | Nyberg et al. | |
| 3,594,452 | 7/1971 | De La Mare et al. | |
| 4,039,629 | 8/1977 | Himes et al. | 525/89 |

Primary Examiner—Lewis T. Jacobs
Attorney, Agent, or Firm—Dean F. Vance

[57] ABSTRACT

A non-delaminating polymeric composition having high performance properties comprises a mixture of particular linear and radial monoalkenyl arene-diene block copolymers, a high density polyethylene, hydrocarbon extending oil and optional filler.

11 Claims, No Drawings

4,216,132

HDPE-CONTAINING FOOTWEAR COMPOSITION

BACKGROUND OF THE INVENTION

The use of certain block copolymers and their compounds in a number of end-uses and especially in footwear, is rapidly expanding. For example, in the footwear industry, certain block copolymer compounds are being used in large volume in the manufacture of a wide variety of shoes including canvas shoes, sport shoes, and dress shoes. The block copolymers may be utilized for this purpose for soling, foxing, innersoles and the like. These compositions are disclosed in Hendricks et al, U.S. Pat. No. Re. 28,236. In general, these shoe component compositions usually comprise a mixture of block copolymer, extending oil, polystyrene and possibly a filler. For the most part, these block copolymer compositions have proven to be particularly advantageous in many respects, including flexibility, processability, lack of vulcanization requirement and wet slip. However, in certain respects, shortcomings have been noted. For example, commercial compounds should be free from delamination, free from elephant hide, and free from flow markings and marring. With respect to many styles in the casual and dress shoe areas of footwear, one of the major shortcomings of the block copolymer compounds such as those referred to in U.S. Pat. No. Re. 28,236 is the lack of a smooth appearance. Present block copolymer compounds lack the smooth, relatively unblemished surface which is characteristic of compression molded vulcanized conventional rubber, injection molded poly(vinyl chloride) or leather. A new composition has now been found that not only has a smooth appearance, but also is non-delaminating and has much improved flex crack resistance.

SUMMARY OF THE INVENTION

The present invention is a composition eminently suitable for footwear applications comprising:

(a) 100 parts by weight of a mixture of a linear ABA block copolymer and a radial (AB—$_x$BA block copolymer where x is greater than 1, the weight ratio of linear to radial block copolymer is between about 25/75 and about 90/10, each block A has an average molecular weight between about 5,000 and 25,000, each block B has an average molecular weight between about 15,000 and about 300,000, and said blocks A comprise 8–65% by weight of each copolymer;

(b) about 10 to about 50 parts by weight of a high density polyethylene having a melt flow index at 190° C. between about 0.1 and 30 and a density greater than about 0.94 g/cm$^3$;

(c) about 0 to about 200 parts by weight of a hydrocarbon rubber extending oil; and (d) about 0 to about 250 parts by weight of a finely divided filler.

It is important that the block copolymers and polyethylene be melt blended under essentially isoviscous melt blending conditions. Accordingly, in selecting the particular polymers, it is preferred that the ratio of the melt viscosity of each of the polymers in the blend be between about 0.1 and 10, more preferably between about 1 and 3, at the shear rate and temperature range employed.

The resulting composition is especially suitable in unit soles for dress shoes and many styles of casual shoes since it has a smooth appearance similar to that of conventional rubber and some types of PVC soles, or a rougher more casual look depending upon the filler used. In addition, the present compositions are non-delaminating and possess improved flex crack resistance, abrasion resistance, adhesion values and tear strengths.

Each of the various components herein employed is significant. The block copolymers must have certain styrene block molecular weights. Below 5,000 molecular weight, domain formation does not occur, and therefore the block copolymers will not possess true thermoplastic elastomeric properties. Above 25,000 molecular weight, it is not typically possible to blend the block copolymers with the other polymers and obtain a non-delaminating blend.

DETAILED DESCRIPTION OF THE INVENTION

The block copolymer component of the present invention is a mixture of a linear ABA type block copolymer and a radial (A—B$)_x$B—A block copolymer where x is over 1. Preferably, x varies from over 1 to 15, more preferably from about 2 to about 6. The A blocks are monoalkenyl arene polymer blocks and the B blocks are elastomeric conjugated diene polymer blocks. Typical linear block copolymers have the structure polystyrene-polybutadiene-polystyrene. A typical radial polymer would comprise one in which the diene block has three or more branches, the tip of each branch being connected to a polystyrene block. See U.S. Pat. No. 3,594,452. Other useful monoalkenyl arenes from which the thermoplastic (non-elastomeric) blocks may be formed include alphamethyl styrene, tert-butyl styrene and other ring alkylated styrenes as well as mixtures of the same. The conjugated diene monomer preferably has 4 to 5 carbon atoms, such as butadiene and isoprene.

The use of both a linear and a radial block copolymer results in improved properties for the mixture compared to the use of just a linear copolymer or just a radial copolymer. The radial copolymer contributes needed strength to the mixture and reduces delamination tendencies. The linear polymer promotes blending and flow. The weight ratio of linear to radial block copolymer may vary from about 25/75 to about 90/10, preferably from about 35/65 to about 65/35.

The average molecular weights of each of the blocks may be varied as desired. The monoalkenyl arene polymer blocks preferably have number average molecular weights between about 5,000 and about 25,000, more preferably between about 8,000 and about 20,000. The elastomeric conjugated diene polymer blocks preferably have number average molecular weights between about 15,000 and about 300,000, more preferably between about 25,000 and about 150,000. The average molecular weights of the polystyrene end blocks are determined by gel permeation chromatography, whereas the polystyrene content of the polymer is measured by infrared spectroscopy of the finished block polymer. The weight percentage of the thermoplastic monoalkenyl arene blocks in the finished block polymer should be between about 8 and 75%, preferably between about 20% and about 50% by weight. The general type and preparation of these block copolymers are described in U.S. Pat. No. Re. 28,246 and in many other U.S. and foreign patents.

The high density polyethylenes useful herein should have melt indices between about 0.1 and 30 and a density greater than about 0.94 grams per cubic centimeter (g/cm$^3$). Typical high density polyethylenes (HDPE) have densities of around 0.95 to 0.96, a crystalline melting point of over about 130° C., and a molecular weight of between about 40,000 and 1,000,000. Melt index is important in that it relates to the viscosity characteristics of the polyethylene. It is important that the viscosity of the polyethylene and block copolymer component at the melt blending temperature and shear rate employed in blending have the ratio limitations as discussed above.

The process by which these polyethylenes are prepared does not form a part of the present invention. They may, in fact, be prepared by any of the well-known methods such as those described in the book "Polyethylene" by Raff and Allison, Interscience Publishers (1956). See also the Kirk-Othmer Encyclopedia of Science and Technology, Volume 14, pages 242-282 (2nd ed. 1967).

The amount of polyethylene employed varies from about 5 phr (parts by weight per hundred parts by weight rubber, or block copolymer as in this case) to about 50 phr, preferably 25-35 phr.

Unlike footwear blends containing low density polyethylene, it is not necessary in the present compositions to add ethylene-vinyl acetate copolymers to the composition in order to reduce delamination. However, ethyl-vinyl acetate copolymers can be added to the composition if desired to vary surface appearance and flow characteristics.

The ethylene-vinyl acetate copolymers which may be used in the compositions of the invention correspond to the general formula

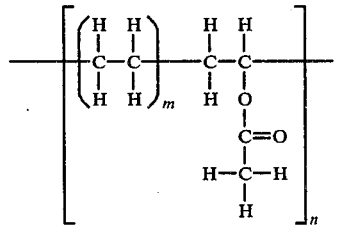

wherein n ranges from about 15 to about 250. The actual occurrence of the acetate substituents along the hydrocarbon chain is of a random character and thus the letter m denotes the average number of ethylene units per vinyl acetate unit in the molecule rather than the presence of regularly recurrent units having the composition given within the above brackets. The value for m ranges from about 6.5 to 40 and preferably from about 7.5 to 30. The latter values for m correspond to a vinyl acetate content in the copolymer of approximately 29 to 9% by weight, respectively. The useful melt indices range from about 0.1 to about 8 grams per 10 minutes. Excellent copolymers are DuPont's Alathon 3135, which has a melt index of 0.3 and contains about 12% vinyl acetate, and Alathon 3175, which has a melt index of 6 and contains about 28% vinyl acetate.

The amount of ethylene-vinyl acetate copolymer employed in the present composition ranges from about 0 to about 100 phr, preferably between about 5 and about 50 phr. As with the polyethylene, it is preferable that the viscosity of the ethylene-vinyl acetate copolymer be matched with that of the polyethylene and the block copolymer components.

The hydrocarbon rubber extending oils, usually referred to as paraffinic/naphthenic oils, are usually fractions of refined petroleum products having less than about 30% by weight of aromatics (by clay-gel analysis) and usually have viscosities between about 100 and 500 SSU at 100° F. Commercial extending oils include SHELLFLEX ® oils, Nos. 310, 371 and 311 (which is a blend of 310 and 371). The amount of extending oil employed varies from about 0-200 phr, preferably from about 25-100 phr.

If fillers are not employed in the composition, the resulting shoe sole will have a high translucency. When translucency is not important, fillers are very useful since their use results in a variety of surface appearances.

The fillers which may be used in the present compositions are well known in the art and include clay, talc, silica, titanium dioxide, carbon blacks, calcium carbonate, and other pigments as well as fibrous fillers such as cellulosic, polyester or acrylic fibers, sawdust, ground cork, etc. Preferred fillers include silica and calcium carbonate. In a most preferred embodiment, the filler is a mixture of calcium carbonate and silica. The amount of filler employed varies from 0-250 phr, preferably 5-60 phr. Additional minor amounts of antioxidants, ultraviolet stabilizers and the like may also be added.

The components of this invention may be combined by processes known in the art including blending such as by extrusion, Banbury mixing or by dry-blending procedures. In the latter case, it is preferred that the block copolymer and other polymers be formed or ground in particles having an average size less than about 4 millimeter diameter onto which the extending oil is absorbed. Following this, the remaining powdered components may be added and vigorously dry-blended therewith such as in well-known dry-blending equipment long used in the PVC dry-blending art. Preferably, however, the various components are melt blended.

While the present specification emphasizes the use of these compositions in footwear components, other end-uses also are contemplated. These include, for example, automotive parts and wire and cable coatings. Tubular products such as hoses and the like also are contemplated.

The use of the present composition in footwear includes especially their use in soling when prepared by injection molding and slab soling, such as produced by cutting shoe sole forms from extruded slabstock. The advantages of the present compositions are most apparent in injection molding of unit soles which are later attached by adhesion or sewing to uppers. In this situation, it has been found that the unit soles are readily removed from the injection mold at cycle times comparable to the compounds referred to in U.S. Pat. No. Re. 28,236 and have reduced weld line formation on the surface. The unit sole is free of the elephant hide phenomenon, which is a wrinkling of the surface on the side of the sole which is concave to the observer when the sole if flexed. This objectionable phenomenon is a common and troublesome characteristic of prior art block copolymer compounds. Unit soles of the present invention are also much more resistant to surface marring and scuffing than prior art compounds. Furthermore, the sole so produced is non-delaminating and has high resistance to flexcracking, abrasion and tearing. These unit soles (which term refers in the trade to a sole including an integral heel portion) are useful both as a leather replacement and as an improvement over the prior art vinyl soles. The compositions also may be used in the manufacture of injection molded canvas shoe soles wherein the soling is directly injection molded onto the canvas upper which may be canvas or various natural and synthetic fibers, including leather, vinyl and polymeric materials. In some cases pre-coating of the upper with a primer is required to effect adhesion.

The invention is further illustrated by means of the following illustrative embodiment, which is given for the purpose of illustration alone and is not meant to limit the invention to the particular reactants and amounts disclosed.

ILLUSTRATIVE EMBODIMENT I

In Illustrative Embodiment I, four different compositions were prepared—two outside the scope of the invention and two within the scope of the invention. The linear block copolymer was a styrene-butadiene-styrene block copolymer having a molecular weight distribution according to the invention. The radial block copolymer was a styrene-butadiene copolymer having a structure $(SB)_xBS$ where x averages about 2.5 and which has a molecular weight distribution according to the invention. The polyethylene employed was a high density polyethylene having a melt flow index of 1.80 and a density of 0.960 g/cm³. The ethylene-vinyl acetate copolymer has a density of 0.950 g/cm³, a melt flow index of 6, and contains about 28% vinyl acetate. The oil employed was SHELLFLEX® 311 hydrocarbon oil. All examples contained a standard antioxidant-inhibitor package.

The individual components were mixed on a Banbury mixer at about 350° C. for a total mix time of about 3 minutes.

Samples of the various compositions were tested according to the following tests:

| Test | Standard Test Number |
|---|---|
| Shore A Hardness | D-2240 |
| Tinius Olsen Stiffness | D-747 |
| Taber Abrasion | D-1044 |
| Ross Cut Growth | D-1052 |

The various formulations and test results are presented below in Table 1.

Table 1

| | Z-55 | Z-55-7 | Z-55-1 | Z-55-6 |
|---|---|---|---|---|
| Composition (Parts by weight) | | | | |
| Linear Block Copolymer | 100 | 50 | 100 | 50 |
| Radial Block Copolymer | — | 50 | — | 50 |
| Extending Oil | 50 | 60 | 50 | 60 |
| CaCO₃ filler | 15 | 15 | 15 | 15 |
| SiO₂ filler | 10 | 10 | 10 | 10 |
| HDPE | 25 | 25 | 25 | 25 |
| EVA | — | — | 10 | 10 |
| Test Results | | | | |
| Taber Abrasion, cc/kc | 0.404 | 0.384 | 0.378 | 0.352 |
| Melt flow, Condition E, g/10 min. | 26.2 | 3.7 | 22.7 | 3.9 |
| Ross Flex Cut Growth, Thousand flexes to 500% growth | 185 | 1300 | 130 | 1000 |

Table 1-continued

| | Z-55 | Z-55-7 | Z-55-1 | Z-55-6 |
|---|---|---|---|---|
| Trouser Tear Strength, (parallel/normal to low) KN/m | 13.1/ 21.0 | 26.3/ 21.0 | 13.1/ 23.6 | 28.0/ 35.0 |
| Adhesion (peel strength), KN/m | 4.4 | 8.2 | 3.5 | 8.2 |
| Hardness, Shore A | 58 | 56 | 58 | 56 |

A comparison of the properties of the compounds with and without the combination block copolymer mixture shows remarkable enhancement of physical properties. The flex crack resistance shows almost a 10-fold improvement, the adhesion values and tear strengths a 2-fold improvement, and the abrasion resistance is further improved.

We claim as our invention:

1. A non-delaminating polymeric composition comprising:
   (a) 100 parts by weight of a mixture of a linear ABA block copolymer and a radial $(AB)_xBA$ block copolymer where x is greater than 1, the weight ratio of linear to radial block copolymer is between about 25/75 and about 90/10, each block A being a monoalkenyl arene polymer having an average molecular weight between about 5,000 and 25,000, each block B being an elastomeric conjugated diene polymer having an average molecular weight between about 15,000 and about 300,000, and said blocks A comprise 8-65% by weight of each copolymer;
   (b) about 10 to about 50 parts by weight of a high density polyethylene having a melt flow index at 190° C. between about 0.1 and 30 and a density greater than about 0.94;
   (c) about 0 to about 200 parts by weight of a hydrocarbon rubber extending oil; and
   (d) about 0 to about 250 parts by weight of a finely divided filler.

2. A composition according to claim 1 wherein said A block is a polystyrene block and said B block is a polybutadiene block.

3. A composition according to claim 1 wherein said block copolymers and polyethylene are melt blended under essentially isoviscous melt blending conditions.

4. A composition according to claim 3 wherein the amount of said polyethylene is about 25 parts by weight.

5. A composition according to claim 2 wherein said radial block copolymer has the structure $(AB)_xBA$ where x is between about 2 and about 6.

6. A composition according to claim 1 wherein said filler is selected from the group consisting of silica and calcium carbonate.

7. A composition according to claim 6 wherein said filler is a mixture of silica and calcium carbonate.

8. A composition according to claim 6 or 7 wherein the amount of said filler is between about 5 and about 60 parts by weight.

9. A composition according to claim 1 wherein the amount of said extending oil is between about 25 and about 100 parts by weight.

10. A composition according to claim 1 wherein said polyethylene has a density of about 0.95 to about 0.96.

11. A shoe sole having the composition of claim 1.